United States Patent

Bussonnet et al.

[11] Patent Number: 5,853,286
[45] Date of Patent: Dec. 29, 1998

[54] MOVABLE FAN VANE WITH A SAFETY PROFILE

[75] Inventors: Pierre Xavier Bussonnet, Sucy en Brie; Jacques Marie Pierre Stenneler, le Chatelet en Brie; Jean Marc Surdi, Rubelles, all of France

[73] Assignee: Societe Nationale d'Etude et de Construction de Moteurs d'Aviation "Snecma", Paris, France

[21] Appl. No.: 781,838

[22] Filed: Jan. 10, 1997

[30] Foreign Application Priority Data

Jan. 23, 1996 [FR] France .................................. 96 00707

[51] Int. Cl.⁶ ...................................................... F01D 5/30
[52] U.S. Cl. .................. 416/193 A; 416/219 R; 416/223 A; 416/248
[58] Field of Search ............................ 416/193 A, 219 R, 416/220 R, 239, 248, 223 A, 238

[56] References Cited

U.S. PATENT DOCUMENTS

| | | |
|---|---|---|
| 5,242,270 | 9/1993 | Partington et al. ...................... 416/248 |
| 5,310,318 | 5/1994 | Lammas et al. ...................... 416/219 R |
| 5,443,365 | 8/1995 | Ingling et al. . |

FOREIGN PATENT DOCUMENTS

| | | |
|---|---|---|
| 2 289 727 | 5/1976 | France . |
| 2311946 | 12/1976 | France ............................. 416/193 A |
| 2144600 | 3/1973 | Germany ........................... 416/223 A |
| 2 064 667 | 6/1981 | United Kingdom . |

*Primary Examiner*—Edward K. Look
*Assistant Examiner*—Richard Woo
*Attorney, Agent, or Firm*—Oblon, Spivak, McClelland, Maier & Neustadt, P.C.

[57] ABSTRACT

A vane for a fan including a platform, a root and a blade. The platform has opposite outer and inner surfaces, and opposite upper and lower surfaces. The upper surface has a camber shape, and the lower surface has a concave shape corresponding to the camber shape of the upper surface. The root is fixed to the inner surface of the platform and adapted to be fixed to a hub of the fan. The blade is fixed to the outer surface of the platform at a position shifted toward the lower surface from a center line between the upper and lower surfaces.

1 Claim, 3 Drawing Sheets

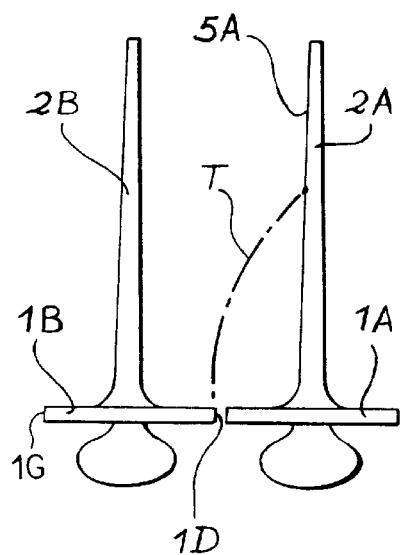
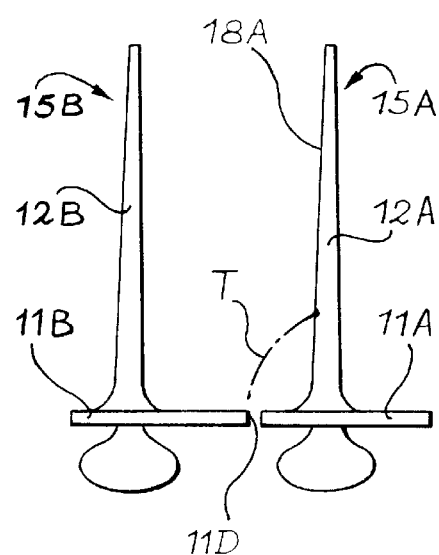
FIG. 3A FIG. 3B
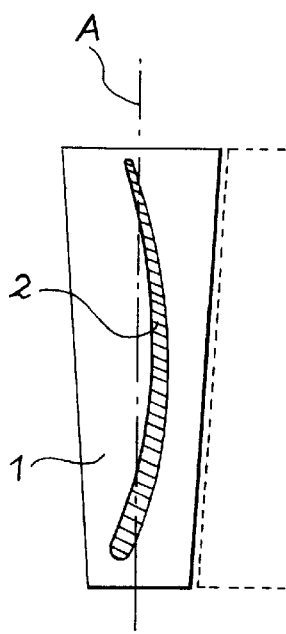
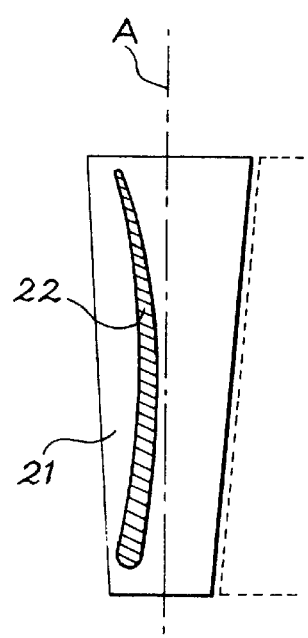
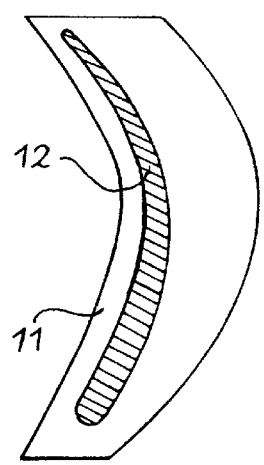
FIG. 4A FIG. 4B FIG. 4C

MOVABLE FAN VANE WITH A SAFETY PROFILE

FIELD OF THE INVENTION

The invention relates to the field of fans, for example, those used in air blowing compressors, but more particularly in bypass or turbofan engines.

PRIOR ART AND THE PROBLEM POSED

In bypass engines, such as those used on aeroplanes, the fan is found at the inlet of the machine. It is used both as the first stage of the compressor and the main stage for the bypass flow. It is generally faired on the outside, this fairing defining the exterior of the front of the jet engine. In other words, the base of the blades fixed to the rotor hub supplies the necessary flow to the inlet of the compressor while the rest of the blade supplies the propulsion energy for the bypass flow.

Given the very high rotational speeds of the rotor of a jet engine, the blades of the jet engine, and in particular those of the fan, are subjected to extremely high mechanical stresses, notably radial stress because of the centrifugal force. Hence, there have already been instances of a vane breaking or coming away from the rotor of the fan during operation of the jet engine. This vane is then liable to damage parts of the motor which are adjacent to it, notably the following blade.

FIG. 1A shows in a view from above and in section, a platform type vane of a fan. Hence one may make out a platform 1, positioned at the base of the vane, between the root, which is hidden in this Figure and the blade 2 which is shown in section. The upper surface side 3 and lower surface side 4 can be picked out. The upper face 5 of the blade is practically not concerned at all with the flow of air and is under negative pressure, while the lower face 6 is completely operational since it is what drives in the air flow passing through the jet engine.

It is to be noted that the platform 1 is relatively protuberant. Because of this and referring to FIG. 1B, when the vane detaches itself from the rotor for reasons of poor mechanical strength, and the platform 1 also detaches itself, it has a tendency to hit the adjacent blade 7. Furthermore, since it has a profile that expands radially with respect to the axis of rotation of the rotor and since its section slopes more and more with respect to the general orientation of its platform 8, the platform 1 of the vane which has just detached itself hits the following blade 7 on its leading edge 9A, at an impact point represented by a cross. It follows that this impact has a tendency to cause fracture of this second blade 7, such a leading edge 9A being an incipient site for a crack, a fissure or a fracture for a metal blade such as those used in the fans of a jet engine.

One can thus understand that this type of mechanical breakdown could cause, not only the fracture of the following blade, but a series of fractures in succession, from one blade to another, and cause general damage to the fan of the jet engine. Such a possibility is therefore to be avoided for aeroplane makers and in particular for the builders of jet engines.

Consequently, the aim of this invention is to remedy this disadvantage of a risk of damage to one or several blades of a fan of a jet engine.

SUMMARY OF THE INVENTION

To this end, the main object of the invention is a movable fan vane with a specified axis of rotation, having an upper surface side and a lower surface side, and including:

a root by means of which the blade is fixed on a hub of the fan, a blade fixed to the root and extending radially with respect to the axis of rotation with a specified curvature and section developing over its whole length and defined by a somewhat convex upper surface and a somewhat concave lower surface joined together by a leading edge and a trailing edge, and a platform between the root and the blade.

According to the invention, a protuberant cambered part is provided on the upper surface side, with the lower and upper surfaces of the blade having a thick section at the base of the blade, at the place where there could be possible impact between two adjacent vanes, so that, in the event of rupture, a blade strikes the following vane between the leading and the trailing edges of this following vane at a place where the vane section is wide, and so that it is able to withstand the possible impact from the preceding vane on this same section and the platform is wider on the upper surface side than on the lower surface side so that, in the event of rupture, one of the vanes strikes the following vane at a lower height than if the platform was centred with respect to the vane.

In its main embodiment, the cambered part is placed on the upper surface side of the platform.

LIST OF THE FIGURES

The invention and its different technical features will be better understood on reading the description which is accompanied by some Figures representing respectively:

FIGS. 1A and 1B, diagrams relating to a vane according to the prior art;

FIGS. 2A and 2B, diagrams relating to a vane according to the invention;

FIGS. 3A and 3B, two explanatory diagrams relating to the position of the platform of the vane according to the invention;

FIGS. 4A, 4B and 4C, diagrams relating to the position of the platform of the vane according to the invention;

FIG. 5, a vane according to the invention.

DETAILED DESCRIPTION OF ONE EMBODIMENT OF THE INVENTION

Figure 1A:
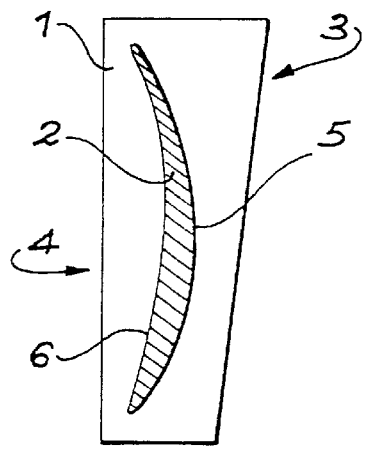
Figure 1B:
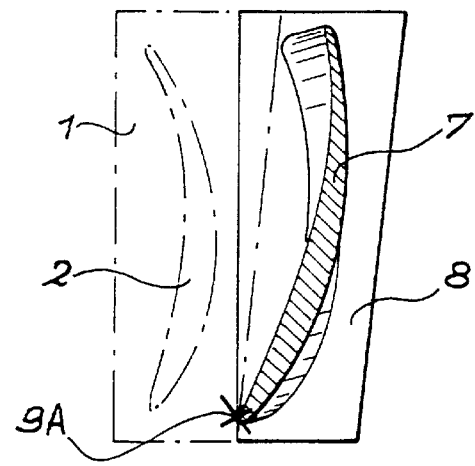
Figure 2A:
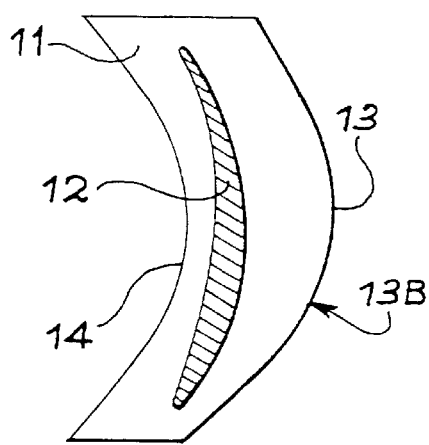
Figure 2B:
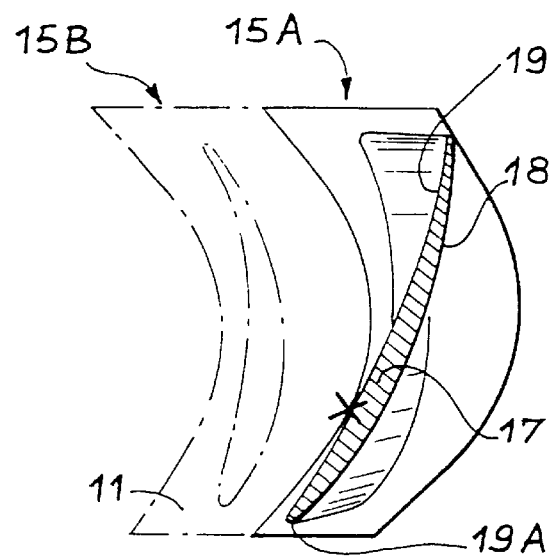

The novelty of the vane with platform according to the invention can be quickly understood by comparing FIGS. 1A and 1B with FIGS. 2A and 2B.

In effect, FIG. 2A shows the vane with platform according to the invention, in a view from above and sectioned at the base of its blade. It is noted in the first place that the platform 11 has a curved shape on the two sides. The direction of this curvature is concordant with the curvature of the blade 12 on the same vane. It is noted that the upper surface 13 of the platform 11 includes a boss or a protuberant part 13B forming the curvature in question. In a corresponding manner, the lower surface of the platform 11 is also curved in the same direction.

Referring to FIG. 2B, this same vane 15 is represented in mixed lines after having detached itself and having hit the following vane 16. Given the cambered shape of the platform 11, notably through its cambered part 13B of the upper surface 13, the point of impact of the first vane 15 which has been detached, on the second vane 16 is moved towards the centre of the blade 17 of the second vane, as is indicated by the cross in bold lines. It can be seen that, at the height where the impact occurs, that is to say, at the base of the blade 17, the section of the blade 17 is relatively large. This section is obtained by a combination of the upper 18 and lower 19 surfaces of the blade at this height. In FIG. 2B, it can be seen that the profile of the blade develops along its length. Hence, the point of impact represented by the bold cross does not cause an incipient fracture as may occur in the case of a collision on the leading edge.

It can be seen that the first vane 15 which has become detached also starts a movement towards the exterior with respect to the rotational axis of the rotor. This means that the platform 11 is not going to strike the platform of the second vane 16 but the blade 17 on its lower surface 19.

Figure 5:
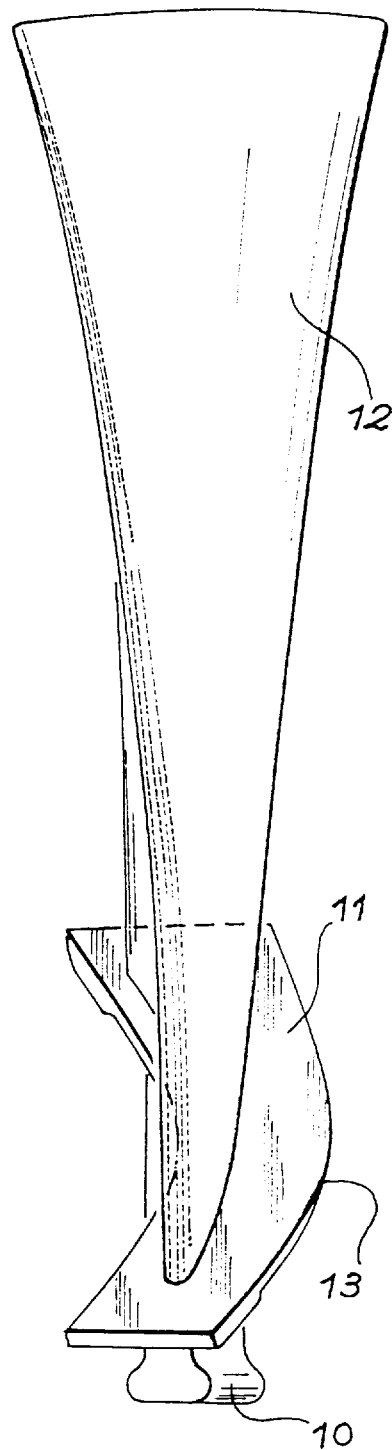

FIG. 5 shows a blade with platform according to the invention, in its entirety. Hence there is the blade 12, fixed to a root 10 between which there is the platform 11. It can be seen that this is slanted for assembly reasons. It can also be seen that, at its base, the section of the blade 12 is relatively thick. This is concordant with the fact that such a vane can be struck at the base of the blade 12 by the preceding vane.

The section of the blade, at the place where a collision may take place with the preceding vane, is also due to the shape of the lower face of the blade concerned. In effect, the lower surface 19 (FIG. 2B) is curved to a relatively small extent. This also favours the movement of the point of impact towards the centre of the blade, thereby distancing it from the leading edge 19A.

In FIG. 3B, it can be observed that the blade 12 is positioned rather over to the left side of platform 11, that is to say, on the lower surface 14 side. This is intentional. In effect, with reference to FIG. 3A, a frontal cross section, which relates to a vane according to the prior art, it can be seen that the platforms 1A and 1B are centred with respect to blades 2A and 2B. In other words, they extend the same distance on each side.

In contrast, in FIG. 3B, a frontal cross section, which relates to two vanes according to the invention, the platforms 11A and 11B are offset to the right with respect to blades 12A and 12B. In other words, the right end 11D of platform 11B of the left vane 15B is a little nearer blade 12A of the vane on the right 15A.

The explanation of this is as follows. The path of the left end 1G of platform 1B of the left vane 15B in the event of its fracture through its root or in the event of its detachment, has been shown diagrammatically by a trajectory marked T. The centrifugal force due to the high rotational speed of the assembly and the rotation of this assembly gives to this trajectory T a parabolic curve shown diagrammatically by the broken lines. The platform 1B and the blade 2B rise towards the right along this trajectory T. The right end 1D of the platform 1B will therefore follow this trajectory and strike the upper face 5A of the blade 2A at a relatively great height. The energy then absorbed via the detached vane can often be sufficient to cause its fracture due to this impact.

Referring to FIG. 3B, it can be seen that platforms 11A and 11B are not centred with respect to blades 12A and 12B but are displaced to the right. This causes an enlargement of platforms 11B to the right and a diminution to the left. Hence, in the event of fracture of the left vane 15B under the same conditions as those in FIG. 3A, this left vane 15B will rise radially along trajectory T represented by a broken line. Since the platform 11A of the right blade 15A is shorter on the left side and as the right end 11D of the left platform 11B is therefore nearer the right blade 12A, the meeting of the two vanes will be more rapid and the impact point much lower.

The consequence of this is that the amount of kinetic energy stored by the detached vane is much less since the radial and tip velocities that this vane has reached are much reduced. The probability of fracture of the adjacent vane is therefore also much reduced.

Furthermore, the point of impact is closer to the root of the blade towards the platform. Having regard to the fact that the blade section is much greater there, the bending moment of the latter is lower and hence the mechanical stresses are also lower. All of these outcomes decrease the probability of fracture of the adjacent vane in the event of fracture of one of the vanes.

FIG. 4A shows a view of a vane according to the prior art, from above and in section. It can be observed that the blade 2 is centred on the platform 1, that is to say, that it is positioned along an axis A dividing the platform 1 into two relatively equal parts.

Referring to FIG. 4B, if blade 22 of a vane is displaced to the left with respect to its platform 21, that is to say if it is displaced to the left of axis A, the platform 21 will have a left part that is much diminished and a right part that is enlarged.

Referring to FIG. 4C, representing the blade according to the invention such as one already represented in FIG. 2A, it can be seen that the blade 12 is positioned on the left side of the platform 11 as suggested by FIG. 3B. In this way, the result represented in FIG. 3B is obtained, that is, a possible point of impact close to the platform of the adjacent vane contacted during detachment of a vane.

The increase of the section of a blade of a vane of a jet engine rotor involves modification of the shape of the blade and hence a modification of its aerodynamic characteristics and its performance. The initial shapes of the blades were planned to give the latter maximum performance. One might think therefore that the modification of the section of a blade which engenders a slight modification of the shape of the blade and notably the lower surface, would modify the aerodynamic performance of the vane by decreasing it. Measurements and tests have shown that this is not the case and that the dynamic efficiency of a vane modified according to the invention is equivalent to the efficiency of preceding vanes which might appear surprising. Of course this does not therefore create supplementary disadvantages according to the invention.

We claim:

1. A vane for a fan comprising:

a platform having opposite outer and inner surfaces, and opposite upper and lower surfaces, the upper surface having a camber shape, the lower surface having a concave shape corresponding to the camber shape of the upper surface;

a root fixed to the inner surface of said platform and adapted to be fixed to a hub of the fan; and a blade fixed to the outer surface of said platform at a position shifted toward the lower surface from a center line between the upper and lower surfaces, wherein a thickness of said blade increases toward said platform; and wherein said blade has opposite leading and trailing edges at which the upper and lower surfaces merge, and said platform and said blade are formed such that when a vane is detached, the detached vane strikes another vane between the leading edge and the trailing edge.

* * * * *